US007296780B1

(12) United States Patent
Hung

(10) Patent No.: US 7,296,780 B1
(45) Date of Patent: Nov. 20, 2007

(54) CONTROL VALVE ASSEMBLY STRUCTURE FOR SPRAY GUNS

(75) Inventor: Shih Yuan Hung, Changhua Hsien (TW)

(73) Assignee: Ruey Ryh Enterprise Co., Ltd., Cnanghua Hsien (TW)

( * ) Notice: Subject to any disclaimer, the term of this patent is extended or adjusted under 35 U.S.C. 154(b) by 0 days.

(21) Appl. No.: 11/176,366

(22) Filed: Jul. 8, 2005

(51) Int. Cl.
*F16K 47/00* (2006.01)

(52) U.S. Cl. ...................... 251/121; 251/331; 239/526; 239/570

(58) Field of Classification Search ................ 251/121, 251/331, 45; 239/526, 570, 574, 525, 527; 137/846, 849, 244
See application file for complete search history.

(56) References Cited

U.S. PATENT DOCUMENTS 3,763,881 A * 10/1973 Jones ......................... 137/414
6,352,212 B1 * 3/2002 Wang ......................... 239/390
6,796,515 B2 * 9/2004 Heren et al. ................ 239/526

* cited by examiner

*Primary Examiner*—Justine R. Yu
*Assistant Examiner*—Andrew J Rost
(74) *Attorney, Agent, or Firm*—Troxell Law Office, PLLC

(57) ABSTRACT

A control valve assembly structure for spray guns comprises a pistol body made up of water inlet and outlet conduits in fluid communication with a valve chamber having a control valve assembly mounted therein wherein the water inlet and outlet conduits and the valve chamber are respectively equipped with a first aperture, a second aperture, and a third aperture having a narrowed opening to form a stop seat for the abutting location of an end cover. The end cover has a receiving section and an actuating groove disposed therein for the accommodation of a valve seat and a spring element respectively, permitting a valve sleeve and a plunger flexibly pushed by the spring element to abut tight against a flexible valve whose water-sealing portion is stretched to tightly seal off the third aperture thereby, facilitating an even application of force thereon as well as an easier and economical processing thereof.

7 Claims, 6 Drawing Sheets

CONTROL VALVE ASSEMBLY STRUCTURE FOR SPRAY GUNS

BACKGROUND OF THE INVENTION

The present invention is related to a control valve assembly structure for spray guns, comprising a pistol body made up of water inlet and outlet conduits in fluid communication with a valve chamber having a control valve assembly mounted therein wherein a pressing guide surface of a plunger is closely abutted tight against a water-sealing portion of a flexible valve, and flexibly pushed and supported by a spring element so that force can be evenly applied onto the water-sealing portion thereof, facilitating an accurate and smooth operation thereof. Besides, the flexible valve is simplified in structure to provide an easier processing and save the cost in the making of mould for the economical efficiency thereof.

Please refer to FIGS. 1, 2. A conventional spray gun structure as disclosed in the U.S. Pat. No. 6,796,515B2 includes a spray gun 10 wherein a pistol body 11 is equipped with a valve chamber 111 and a valve shaft 12 mounted to a flexible diaphragm 13 at the valve chamber 111 therein. The control diaphragm 13 is clamped and located by an end cover 14 and a valve seat 15 to form a water seal-off state. When the valve shaft 12 is pushed, the flexible diaphragm 13 affected by the fluid pressure generated inside the pistol body 11 will be expanded to detach from the valve seat 15 thereof, permitting the fluid flow accommodated in an inlet conduit 16 to come into the valve seat 15 before sprayed outwards via an outlet conduit 17. However, the flexible diaphragm 13 simply makes use of the tension to control the shutoff or discharge of fluid flow, which is complicatedly structured and may increase the cost in the making of mold thereof. Besides, the flexible diaphragm 13 is fixedly located by the end cover 14 and the valve seat 15 and can only depend on the tension produced by the interior pressure of the pistol body 11 to control the operation thereof, which can easily cause flexible fatigue of the diaphragm 13 under the repeated expansion and contraction thereof and lead to awkward and jamming operation thereof.

SUMMARY OF THE PRESENT INVENTION

It is, therefore, the primary purpose of the present invention to provide a control valve assembly structure for spray guns, comprising a pistol body made up of water inlet and outlet conduits in fluid communication with a valve chamber having a control valve assembly mounted therein wherein a pressing guide surface of a plunger is closely abutted tight against a water-sealing portion of a flexible valve, and flexibly pushed and supported by a spring element so that force can be evenly applied onto the water-sealing portion thereof, facilitating an accurate and smooth operation thereof. Besides, the flexible valve is simplified in structure to provide an easier processing and save the cost in the making of mold for the economical efficiency thereof.

DETAILED DESCRIPTION OF THE PREFERRED EMBODIMENTS

Figure 1:
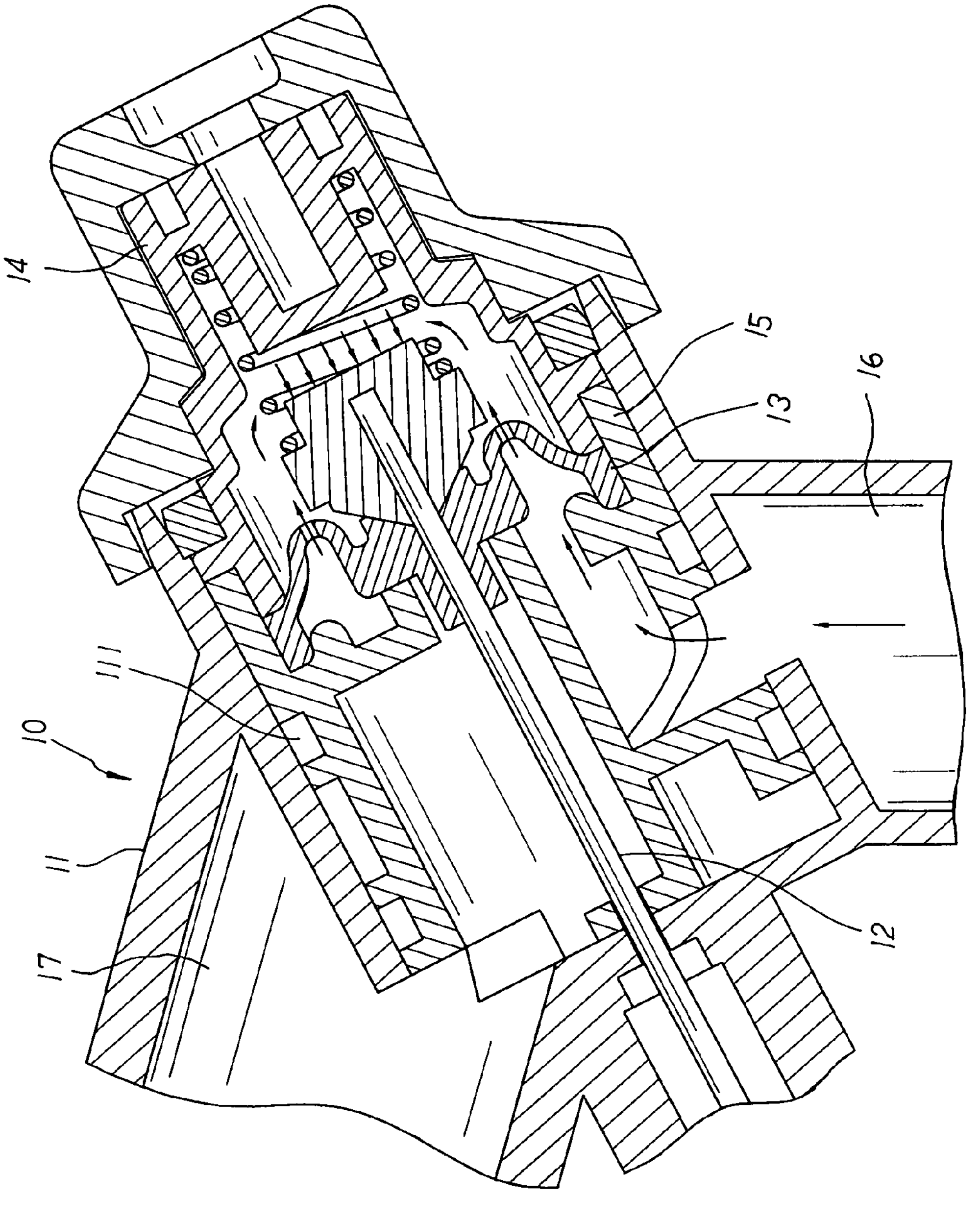
FIG. 1 PRIOR ART
FIG. 1 is a conventional spray gun structure as disclosed in the U.S. Pat. No. 6,796,515B2 in a water-shutoff state.
Figure 2:
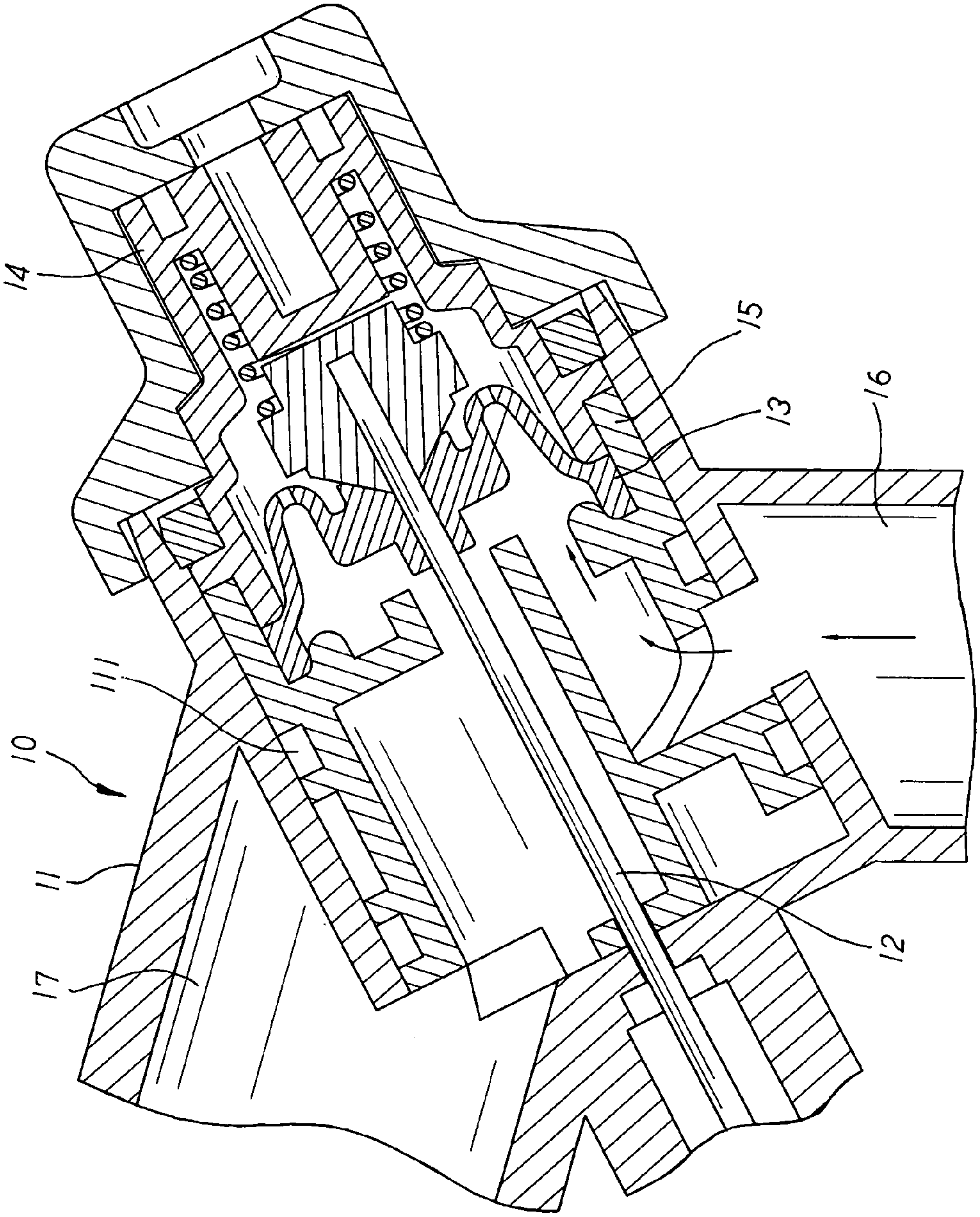
FIG. 2 PRIOR ART
FIG. 2 is the conventional spray gun structure as disclosed in the U.S. Pat. No. 6,796,515B2 in a state of water discharge.
Figure 3:
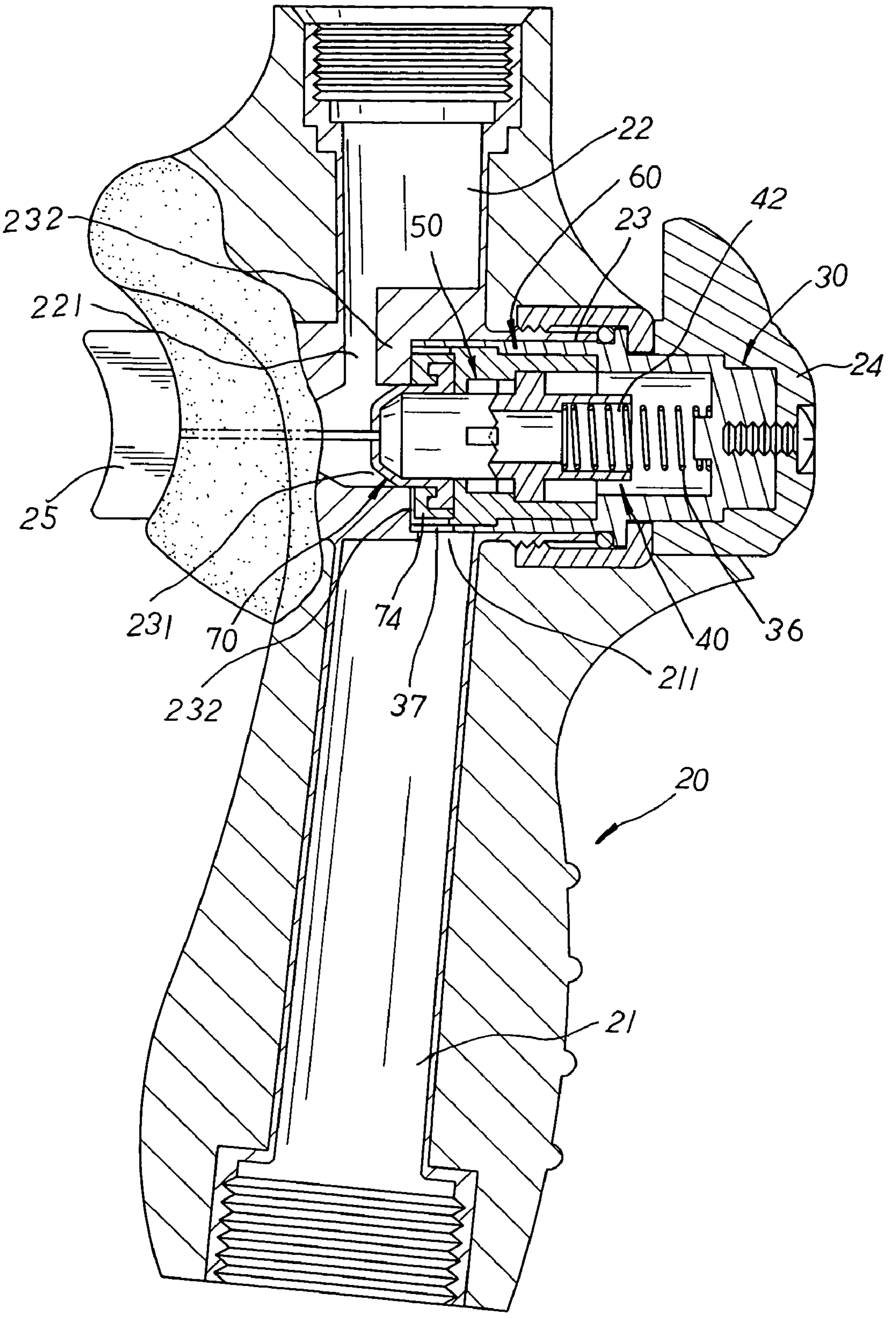
FIG. 3 is an assembled cross sectional view of the present invention.
Figure 4:
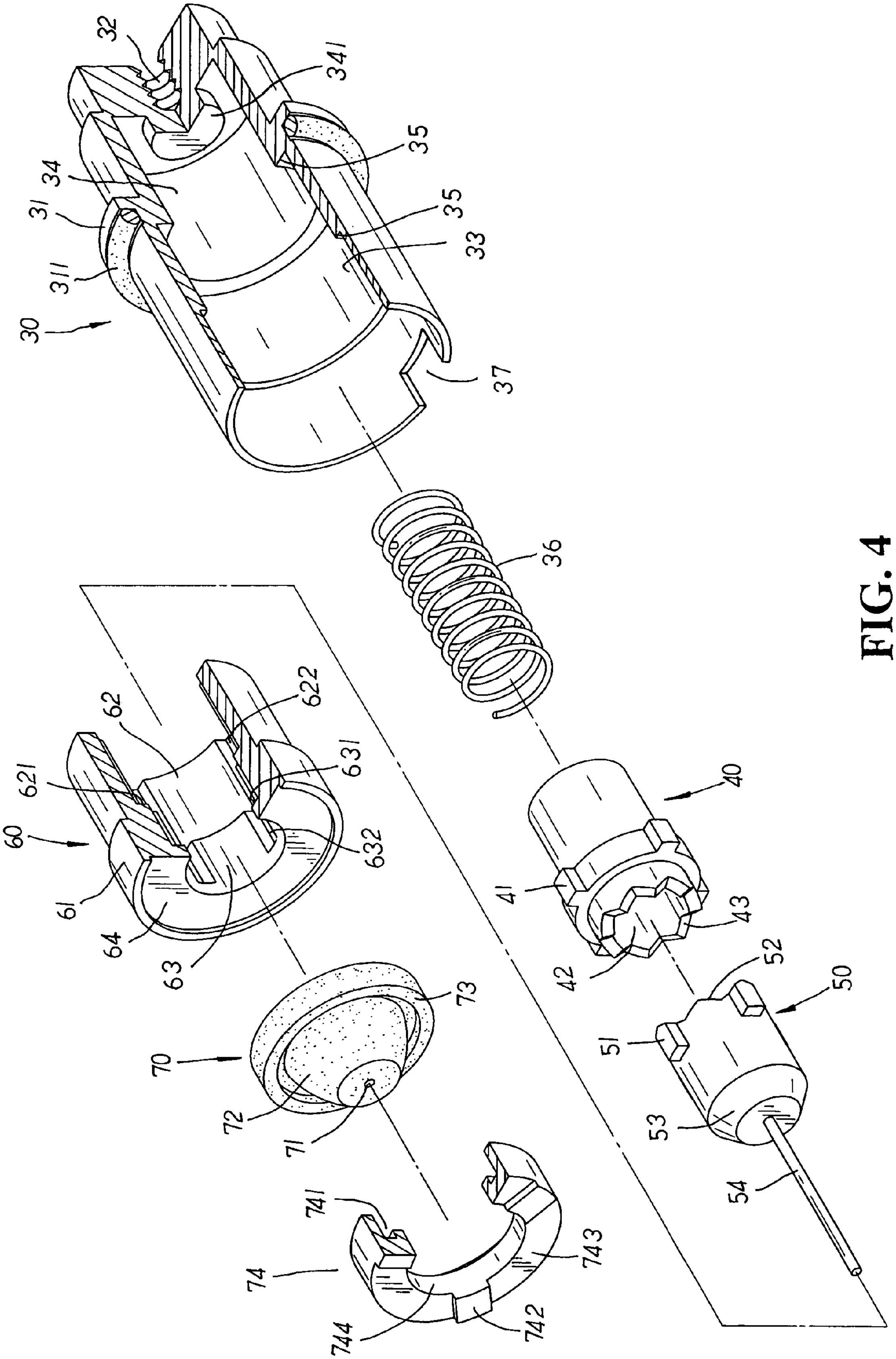
FIG. 4 is an exploded perspective view of a control valve assembly of the present invention.
Figure 5:
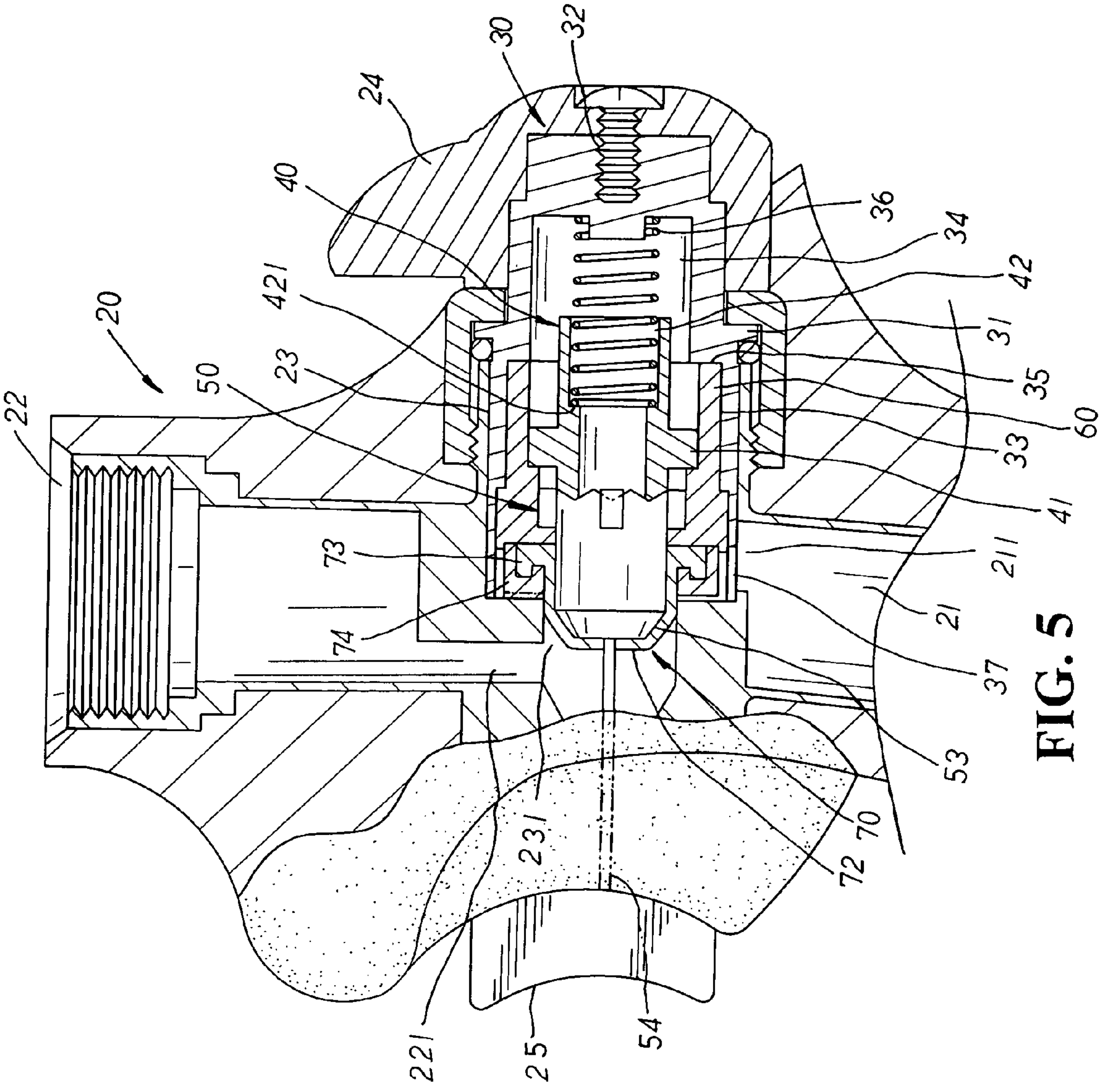
FIG. 5 is a partially assembled and cross sectional view of the present invention.

Please refer to FIG. 3 showing an assembled cross sectional view of the present invention (accompanied by FIGS. 4, 5). The present invention is related to a control valve assembly structure for spray guns, comprising a pistol body 20 having a water inlet conduit 21 and a water outlet conduit 22 in fluid communication with a valve chamber 23 disposed at the interior thereof to form a first aperture 211, a second aperture 221, and a third aperture 231 therein respectively wherein the third aperture 231 is shaped with a narrowed opening so as to provide a stop seat 232 defining the outer periphery of the third aperture 231 thereon. Into the valve chamber 23 thereof is accommodated a control valve assembly made up of an end cover 30, a sleeve valve 40, a plunger 50, a valve seat 60, and a flexible valve 70. The end cover 30 with one contact edge abutted against the stop seat 232 of the valve chamber 23 is equipped with a positioning seat 31 having a sealing ring 311 mounted thereon to precisely abut tight against the opening end of the valve chamber 23 thereby, and a screw hole 32 disposed at the other contact end thereof to reciprocally lock with an adjusting cap 24 so as to adjustably rotate the end cover 30 thereby. At the interior of end cover 30 is disposed a receiving section 33 for the accommodation of the valve seat 60 therein, and an actuating chamber 34 with a plurality of stop rings 35 formed at the inner wall thereon, permitting the end edge of the valve seat 60 and a positioning ring 61 protruding at the outer periphery thereon to respectively abut against the stop rings 35 for location thereby. At the bottom of the actuating chamber 34 thereof is disposed a protrusive rod 341 for the mounting of a spring element 36 thereon. The interior of the valve seat 60 is shaped in stepwise having a first chamber 62 and a second chamber 63 respectively formed therein to provide a set of first and second locating seats 621, 631 for the abutting location of the sleeve valve 40 and the plunger 50 thereby. The inner wall of the first and second chambers 62, 63 is respectively defined by a plurality of first/second guide grooves 622, 632 to be reciprocally matched with a plurality of first/second guide blocks 41, 51 respectively protruding at the outer periphery of the sleeve valve 40 and the plunger 50 thereon. The sleeve valve 40 also includes a sleeve hole 42 with a limiting seat 421 defining thereon to be mounted to the other end of the spring element 36 thereof, permitting the sleeve valve 40 and the plunger 50 accurately in flexible support by the spring element 36 to respectively abut tight and close against the first and the second locating seats 621, 631 thereon, and the plunger 50 to extend outwards from the valve seat 60 thereof. The sleeve valve 40 has serrated toothed surface 43 defining one end edge thereon to precisely mesh with a matching toothed end 52 of the plunger 50 disposed at the corresponding contact side thereof. Besides, the plunger 50 has a conically tapered pressing guide surface 53 disposed at the other end thereon, and a valve shaft 54 extending from the center of the pressing guide surface 53 to be actuated by the pushing operation of a control button 25 thereby. The flexible valve 70 has a central thru-hole 71 disposed thereon for the extending there-through of the valve shaft 54 of the plunger 50, permitting the flexible valve 70 to accommodate into an indented cavity 64 defining one end surface of the valve seat 60 thereof. A conic water-sealing portion 72 is provided protruding at one side of the flexible valve 70 to be closely abutted tight by the pressing guide surface 53 thereof, and an inserting rib 73 is annularly disposed at the outer periphery of the conic water-sealing portion 72 thereof to be reciprocally mounted into an insert recess 741 defining one end surface of a support collar 74, permitting the outer periphery and the one end surface of the support collar 74 thereof to precisely abut against the indented cavity 64 thereby. Multiple support blocks 742 are provided protruding at the other end surface of the support collar 74 to abut against the stop seat 232 of the valve chamber 23, permitting a plurality of water inlet spaces 743 to form between the stop seat 232 and the support blocks 742 thereby. A limiting hole 744 is formed at the center of the support collar 74 for the extending there-through of the water-sealing portion 72 of the flexible valve 70 that is flexibly pushed and stretched by the pressing guide surface 53 of the plunger 50 to abut closely against the third aperture 231 so as to securely separate the first aperture 211 from the second aperture 221 to achieve a water sealing-off state thereby. Besides, the end cover 30 also has a passage 37 disposed at one side corresponding to the first aperture 211 of the water inlet conduit 21, and the adjusting cap 24 is adjustably rotated to change the position of the passage 37 so as to control the amount of water discharge thereby.

Figure 6:
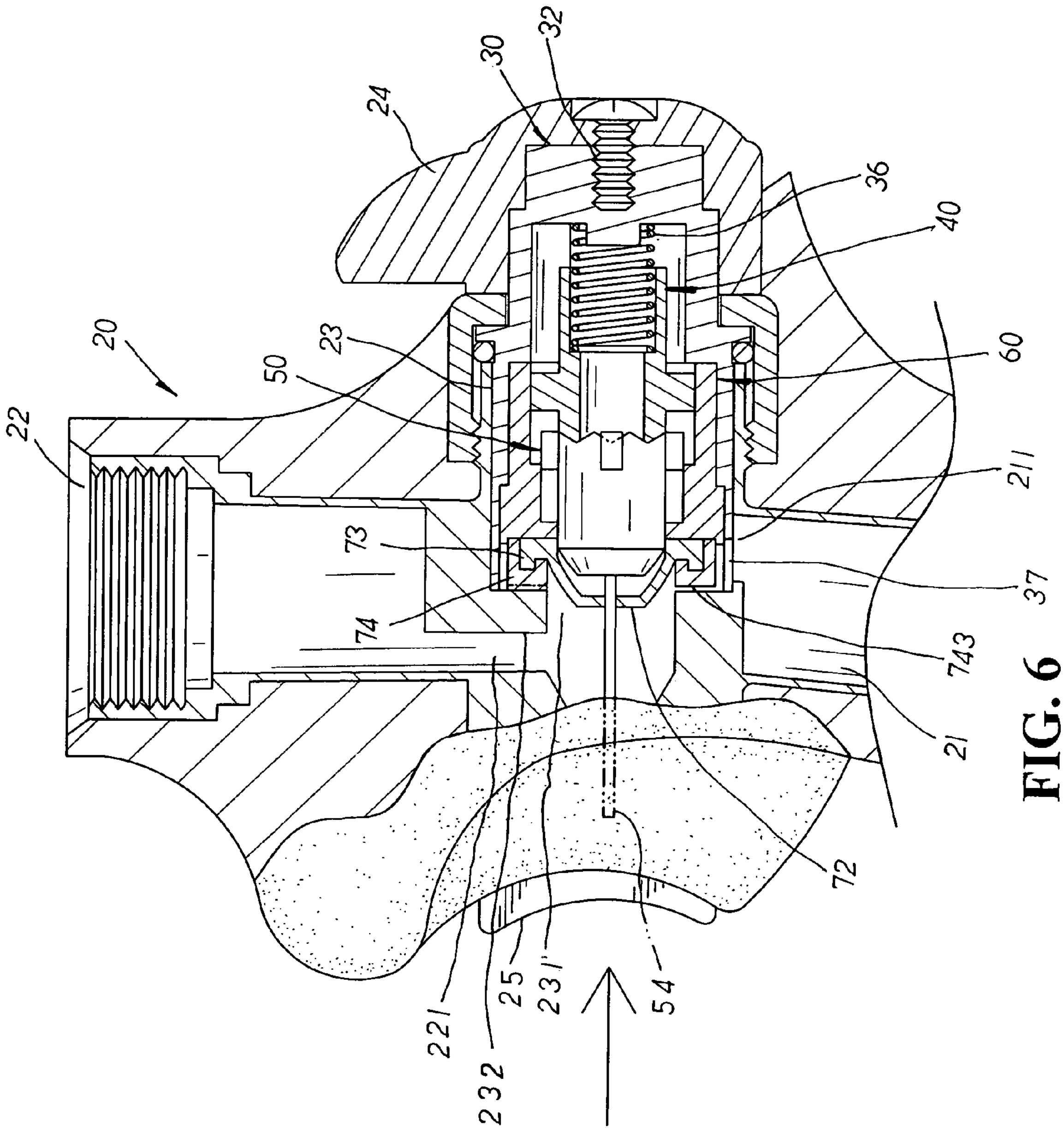
FIG. 6 is a diagram showing a pressing operation of the present invention in a state of water discharge.

Please refer to FIG. 6 showing a press operation of the present invention in a state of water discharge. The control button 25 is pushed to press against the valve shaft 54 and allow the guide blocks 51, 41 of the plunger 50 and the sleeve valve 40 thereof to respectively slide along the guide grooves 622, 632 of the first and second chambers 62, 63 thereof and compress against the spring element 36 thereby. Meanwhile, the pressing guide surface 53 of the plunger 50 will stop abutting against the flexible valve 70, releasing the water-sealing portion 72 thereof from the pushing force of the spring element 36, the sleeve valve 40 and the plunger 50 thereof to flexibly bounce inwards so as to fluidly communicate the third aperture 231 with the first and second apertures 211, 221 in an opening-up state thereby. Therefore, fluid flow accommodated in the water inlet conduit 21 will sequentially flow from the first aperture 211 and the passage 37 of the end cover 30 to go through the water inlet spaces 743 of the support collar 74 and then the third and second apertures 231, 221 till entering the water outlet conduit 22 to be discharged there-from. In case the control button 25 is released to stop the pressing operation of the valve shaft 54, the compressed spring element 36 will flexibly rebound and again press against the sleeve valve 40 and the plunger 50 to recover their former positions respectively. As a result, the water-sealing portion 74 of the flexible valve 70 will be synchronically pushed and stretched by the pressing guide surface 53 of the plunger 50 to closely abut tight against the third aperture 231 and seal off the water discharge thereby. Therefore, via the pressing guide surface 53 of the plunger 50 in close abutting contact with the water-sealing portion 74 of the flexible valve 70 and flexibly pushed and supported by the spring element 36 thereof, force can be evenly applied onto the water-sealing portion 74 thereof to facilitate more accurate and smooth operation thereof. Besides, the flexible valve 70 is simplified in structure to provide an easier processing as well as to save the cost in the opening of mold for the economical efficiency thereof.

What is claimed is:

1. A control valve assembly structure for spray guns, comprising a pistol body having a water inlet conduit and a water outlet conduit in fluid communication with a valve chamber into which is accommodated a control valve assembly made up of an end cover, a sleeve valve, a plunger, a valve seat, and a flexible valve; the control valve assembly structure for a spray gun further comprising:

the water outlet conduit, the water inlet conduit, and the valve chamber of the pistol body thereof being respectively equipped with a second aperture, a first aperture, and a third aperture shaped with a narrowed opening to provide a stop seat defining the outer periphery thereon;

the end cover of the control valve assembly having one contact edge abutted against a stop seat of the valve chamber, a positioning seat with a sealing ring mounted thereon to precisely abut tight against the opening end of the valve chamber thereby, and an adjusting cap locked at the other contact end thereon so as to adjustably rotate the end cover thereby; at the interior of end cover being disposed a receiving section for the accommodation of the valve seat therein, and an actuating chamber for the abutting location of the valve seat and a spring element thereby;

the valve seat having a first chamber and a second chamber respectively formed at the interior therein to provide a set of first and second locating seats for the abutting location of the sleeve valve and the plunger thereby;

the sleeve valve having a sleeve hole with a limiting seat defining thereon to be mounted to the other end of the spring element thereof, permitting the plunger flexibly supported by the spring element to extend outwards from the valve seat thereof;

the plunger having a pressing guide surface disposed at one end thereon, and a valve shaft extending from the center of the pressing guide surface thereof to be actuated by the pushing operation of a control button thereby;

the flexible valve having a central thru-hole for the extending there-through of the valve shaft of the plunger, permitting the flexible valve to accommodate into an indented cavity defining one end surface of the valve seat thereby; the flexible valve also including a water-sealing portion disposed at one side thereon to be pushed and abutted tight by the pressing guide surface of the plunger thereby, and an inserting rib annularly disposed at the outer periphery of the water-sealing portion to be reciprocally mounted to an insert recess of a support collar thereby, permitting the support collar to precisely abut against the valve seat thereby;

the support collar having multiple support blocks protruding at the other end surface thereon to abut against the stop seat of the valve chamber, permitting a plurality of water inlet spaces to be formed between the stop seat and the support blocks thereof, and a limiting hole being disposed at the center of the support collar for the extending there-through of the water-sealing portion of the flexible valve that is flexibly pushed and stretched by the pressing guide surface of the plunger to abut closely against the third aperture so as to securely separate the first aperture from the second aperture and achieve a water sealing-off state thereby;

the end cover also having a passage disposed at one side corresponding to the first aperture of the water inlet conduit, and the adjusting cap being adjustably rotated to change the position of the passage so as to control the amount of water discharge thereby.

2. The control valve assembly structure for spray guns as claimed in claim 1 wherein the end cover is equipped with a screw hole disposed at one end edge thereon to be reciprocally locked to the adjusting cap thereby.

3. The control valve assembly structure for spray guns as claimed in claim 1 wherein the receiving section and the actuating chamber of the end cover is provided with a plurality of stop rings formed at the inner wall thereon, permitting the end edge of the valve seat and a positioning ring protruding at the outer periphery thereon to respectively abut against the stop rings for location thereby.

4. The control valve assembly structure for spray guns as claimed in claim 1 wherein the first and second chambers of the valve seat is respectively provided with a plurality of first/second guide grooves to be matched to a plurality of first/second guide blocks respectively protruding at the outer periphery of the sleeve valve and the plunger thereon for reciprocal engagement therewith.

5. The control valve assembly structure for spray guns as claimed in claim 1 wherein the sleeve valve has serrated toothed surface defining one end edge thereon to precisely mesh with a matching toothed end of the plunger disposed at the corresponding contact side thereon.

6. The control valve assembly structure for spray guns as claimed in claim 1 wherein the pressing guide surface of the plunger is made in a conically tapered shape.

7. The control valve assembly structure for spray guns as claimed in claim 1 wherein the water-sealing portion of the flexible valve is made in a conic shape.

* * * * *